United States Patent
He et al.

(10) Patent No.: US 12,034,545 B2
(45) Date of Patent: Jul. 9, 2024

(54) PHYSICAL UPLINK CONTROL CHANNEL (PUCCH) RESOURCE ALLOCATION AND HYBRID AUTOMATIC REPEAT REQUEST (HARQ) ACKNOWLEDGEMENT (ACK) CODEBOOK DETERMINATION ENHANCEMENTS IN CASE OF MULTIPLE DOWNLINK CONTROL INFORMATION (DCI) IN A SLOT

(71) Applicant: Apple Inc., Cupertino, CA (US)

(72) Inventors: Hong He, Sunnyvale, CA (US); Gang Xiong, Portland, OR (US); Debdeep Chatterjee, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 17/286,586

(22) PCT Filed: Nov. 1, 2019

(86) PCT No.: PCT/US2019/059547
§ 371 (c)(1),
(2) Date: Apr. 19, 2021

(87) PCT Pub. No.: WO2020/093016
PCT Pub. Date: May 7, 2020

(65) Prior Publication Data
US 2021/0391955 A1 Dec. 16, 2021

Related U.S. Application Data

(60) Provisional application No. 62/754,970, filed on Nov. 2, 2018.

(51) Int. Cl.
H04W 4/00 (2018.01)
H04L 1/1812 (2023.01)
(Continued)

(52) U.S. Cl.
CPC .......... *H04L 1/1819* (2013.01); *H04L 1/1896* (2013.01); *H04W 24/08* (2013.01);
(Continued)

(58) Field of Classification Search
CPC ... H04L 1/1819; H04L 1/1896; H04L 1/1861; H04L 5/0007; H04L 5/0051;
(Continued)

(56) References Cited

U.S. PATENT DOCUMENTS

2017/0207895 A1\* 7/2017 Yang ...................... H04W 72/23
2019/0132861 A1\* 5/2019 Koorapaty ............ H04L 1/1819
(Continued)

OTHER PUBLICATIONS

3rd Generation Partnership Project; Technical Specification Group Radio Access Network; NR; Physical layer procedures for control (Release 15); 3GPP TS 38.213 V15.3.0 (Sep. 2018); http://www.3gpp.org.
(Continued)

*Primary Examiner* — Chuong T Ho
(74) *Attorney, Agent, or Firm* — Eschweiler & Potashnik, LLC

(57) ABSTRACT

A device, system, method, machine readable medium. The method includes: decoding a physical downlink control channel (PDCCH) from a Node B, the PDCCH scheduling a physical downlink shared channel (PDSCH); determining at least one of a control resource set (CORESET) index or a starting control channel element (CCE) index of the PDCCH; decoding the PDSCH; determining, based the at least one of the CORESET index or the CCE index, a physical uplink control channel (PUCCH) resource to carry hybrid automatic repeat request (HARQ) acknowledgment (ACK) (HARQ-ACK) feedback corresponding to the PDSCH to the Node B; and causing transmission of the HARQ-ACK feedback based on the PUCCH resource.

17 Claims, 8 Drawing Sheets

(51) Int. Cl.
    *H04L 1/1867*      (2023.01)
    *H04W 24/08*      (2009.01)
    *H04W 72/0446*      (2023.01)
    *H04W 72/23*      (2023.01)
    *H04W 72/56*      (2023.01)

(52) U.S. Cl.
    CPC ....... *H04W 72/0446* (2013.01); *H04W 72/23* (2023.01); *H04W 72/56* (2023.01)

(58) Field of Classification Search
    CPC ..... H04L 5/0057; H04L 5/001; H04L 5/0037; H04L 5/0044; H04L 5/0053; H04L 5/0064; H04L 5/0055; H04W 24/08; H04W 72/0446; H04W 72/23; H04W 72/56
    USPC .......................................... 370/329, 330, 328
    See application file for complete search history.

(56) References Cited

U.S. PATENT DOCUMENTS

| | | | | |
|---|---|---|---|---|
| 2019/0306923 | A1* | 10/2019 | Xiong | ................. H04J 13/0062 |
| 2021/0211241 | A1* | 7/2021 | Xiong | ................... H04L 5/0044 |
| 2021/0314107 | A1* | 10/2021 | Yoshioka | .............. H04L 1/1819 |
| 2022/0052824 | A1* | 2/2022 | Kim | ...................... H04L 1/0027 |

OTHER PUBLICATIONS

PCT Search Report dated Feb. 26, 2020 in connection with PCT Application No. PCT/US2019/059547.
PCT Written Opinion dated Feb. 26, 2020 in connection with PCT Application No. PCT/US2019/059547.
Huawei et al., Remaining issues on NR CA, R1-1805895, 3GPP TSG RAN WG1 #93, Busan, Korea, May 11, 2018 pp. 1-9.
Intel Corporation, Support of different numerologies for carrier aggregation, R1-1800338, 3 GPP TSG RAN WG1 #AH 1801, Vancouver, Canada, Jan. 13, 2018 pp. 1-6.
Samsung, Summary on CA Aspects, R1-1801024, 3 GPP TSG RAN WG1 #AH 1801, Vancouver, Canada, Jan. 24, 2018 slides 1-6.
Huawei et al., Remaining issues on bandwidth part and CA, R1-1809752, 3 GPP TSG RAN WG1 #94, Gothenburg, Sweden, Aug. 22, 2018 sections 1-6.
Spreadtrum Communications, Consideration on URLLC physical layer enhancement, R1-1808810, 3 GPP TSG RAN WG1 #94, Gothenburg, Sweden, Aug. 10, 2018 sections 1-3.

* cited by examiner

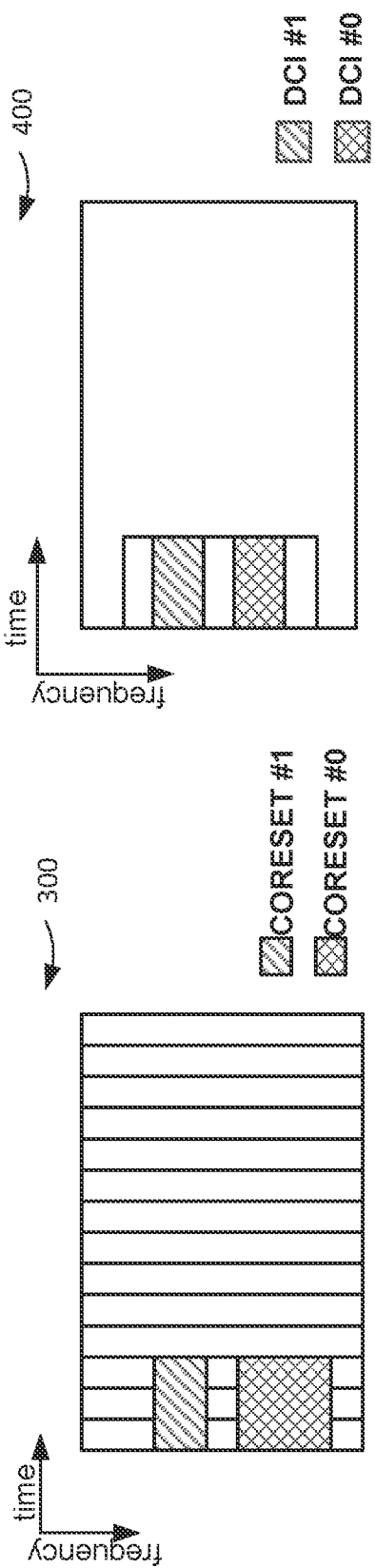
FIG. 3
FIG. 4
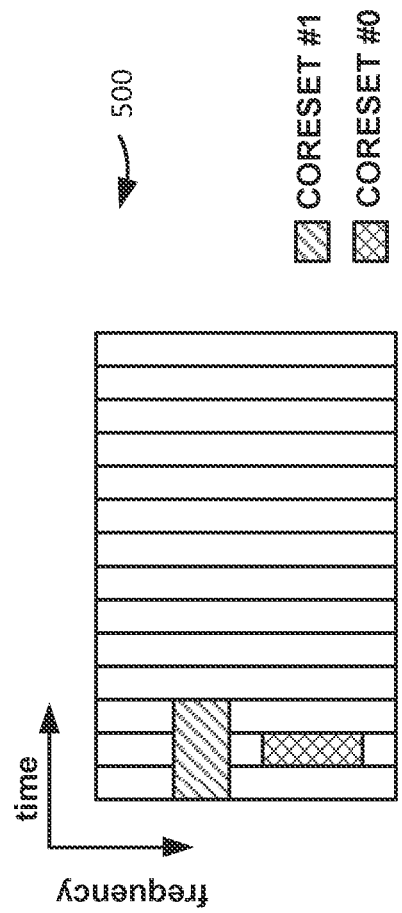
FIG. 5

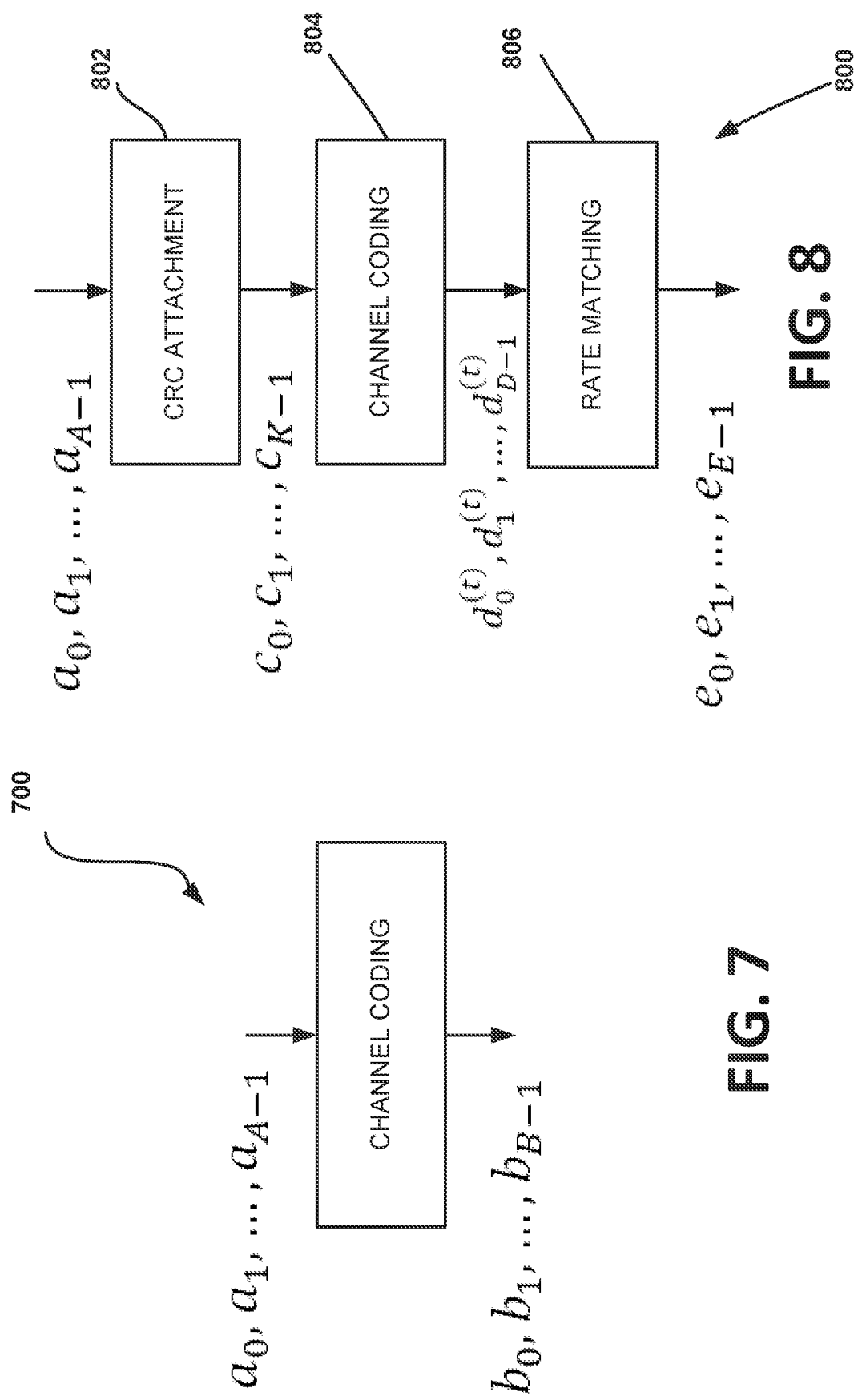

PHYSICAL UPLINK CONTROL CHANNEL (PUCCH) RESOURCE ALLOCATION AND HYBRID AUTOMATIC REPEAT REQUEST (HARQ) ACKNOWLEDGEMENT (ACK) CODEBOOK DETERMINATION ENHANCEMENTS IN CASE OF MULTIPLE DOWNLINK CONTROL INFORMATION (DCI) IN A SLOT

CROSS REFERENCE TO RELATED APPLICATIONS

This application is a National Phase entry application of International Patent Application No. PCT/US2019/059547 filed Nov. 1, 2019, which claims the benefit of and priority from U.S. Provisional Patent Application No. 62/754,970 entitled "PHYSICAL UPLINK CONTROL CHANNEL (PUCCH) RESOURCE ALLOCATION AND HYBRID AUTOMATIC REPEAT REQUEST (HARQ) ACKNOWLEDGEMENT (ACK) CODEBOOK DETERMINATION ENHANCEMENTS IN CASE OF MULTIPLE DOWNLINK CONTROL INFORMATION (DCI) IN A SLOT," filed Nov. 2, 2018, the entire disclosure of which is incorporated herein by reference.

FIELD

Various embodiments generally relate to the field of cellular communications, and particularly to scheduling hybrid automatic repeat request (HARQ) acknowledgment (ACK) (HARQ-ACK) feedback in a cellular network.

BACKGROUND

Current Third Generation Partnership Project (3GPP) New Radio (NR) specifications (or 5G specifications) do not specifically address issues related to PUCCH resource allocation and HARQ-ACK codebook determination in case of multiple downlink control informations (DCIs) scheduling multiple physical downlink shared channels (PDSCHs) in a slot.

BRIEF DESCRIPTION OF THE DRAWINGS

FIG. 3 illustrates a radio transmission showing one example of priority order for PUCCH resource determination according to an embodiment;

FIG. 4 illustrates a radio transmission showing one example of priority order for PUCCH resource determination according to another embodiment;

FIG. 5 illustrates a radio transmission showing one example of priority order for PUCCH resource determination according to yet another embodiment;

FIG. 7 is a flow diagram for a process to encode uplink control information (UCI) according to an embodiment, where three forms of channel coding may be used;

FIG. 8 is a flow diagram for a process to encode UCI according to another embodiment

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Introduction

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In NR, it was agreed that for semi-static and dynamic hybrid automatic repeat request-acknowledgement (HARQ-ACK) codebook, only one HARQ-ACK feedback is to be transmitted in one slot. Further, this HARQ-ACK feedback can be carried by either physical uplink control channel (PUCCH) or physical uplink shared channel (PUSCH).

Figure 1:
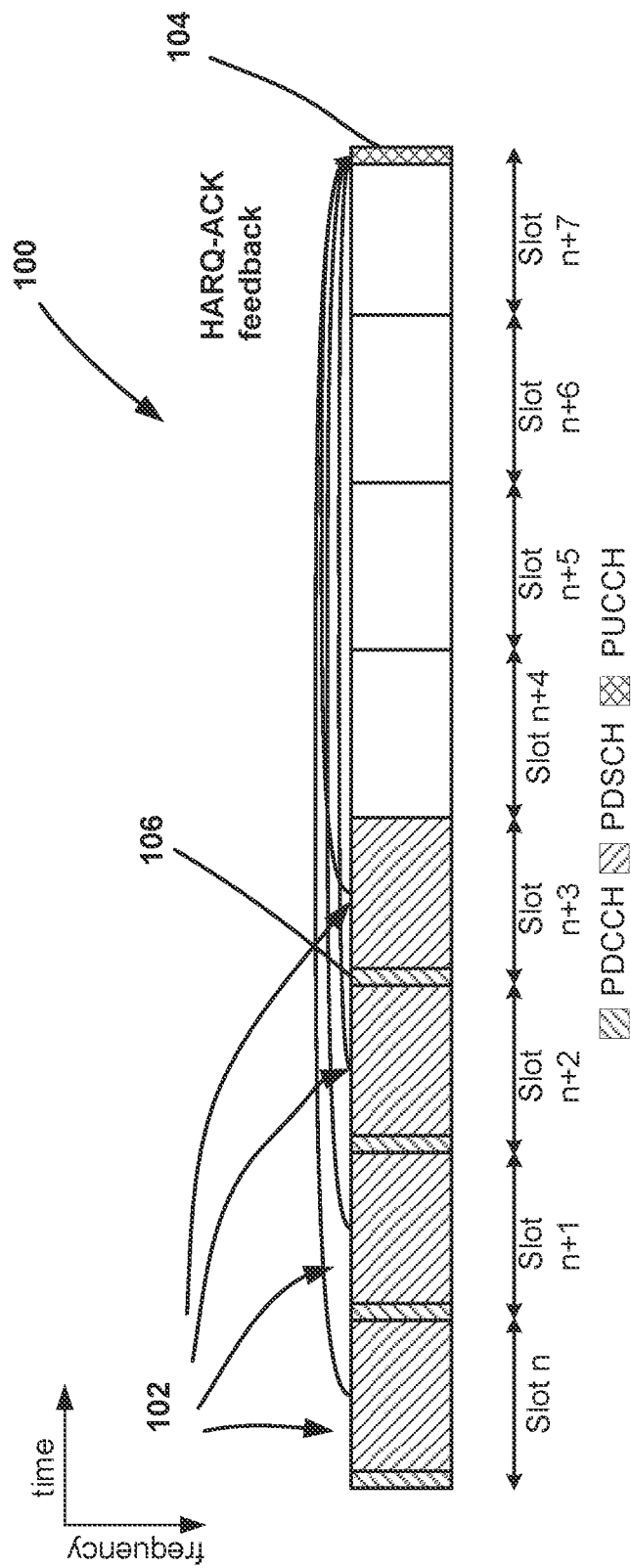
FIG. 1 illustrates radio transmissions in the time and frequency domain, showing one example of HARQ-ACK feedback for multiple physical downlink shared channels (PDSCHs)

FIG. 1 illustrates radio transmissions 100 within 8 slots in the time and frequency domain, showing one example of HARQ-ACK feedback for multiple physical downlink shared channels (PDSCHs) 102. In this example, a PUCCH resource 104 for carrying HARQ-ACK feedback is determined by the last DCI in slot n+3 and/or the starting control channel element (CCE) index of the corresponding PDCCH 106. In NR systems, only one HARQ-ACK feedback or PUCCH resource is transmitted in one slot, which is slot n+7 as shown by FIG. 1.

In order to determine the PUCCH resource for carrying HARQ-ACK feedback, the UE first determines a PUCCH resource set based on a payload size of HARQ-ACK feedback, and subsequently selects the PUCCH resource from the PUCCH resource set in accordance with the PUCCH resource indicator of the last DCI and/or the starting CCE index of the corresponding PDCCH transmission. The "last DCI" as noted above is determined in a frequency first and time second manner. In particular, detected DCI formats are first indexed in an ascending order across serving cell indexes and are then indexed in an ascending order across PDCCH monitoring occasion indexes.

For NR, it was agreed that two or more downlink control information (DCI) can be transmitted in a slot to schedule two or more PDSCH transmissions. In case HARQ-ACK feedbacks for the PDSCHs are scheduled in the same slot, current mechanisms as defined by 3GPP standards are not sufficient to identify the PUCCH resource carrying HARQ-ACK feedback. Therefore, a mechanism needs to be defined for dynamic HARQ-ACK codebook determination and PUCCH resource allocation in order to ensure alignment between a NR evolved Node B (gNB or gNodeB) and the user equipment (UE).

Figure 2:
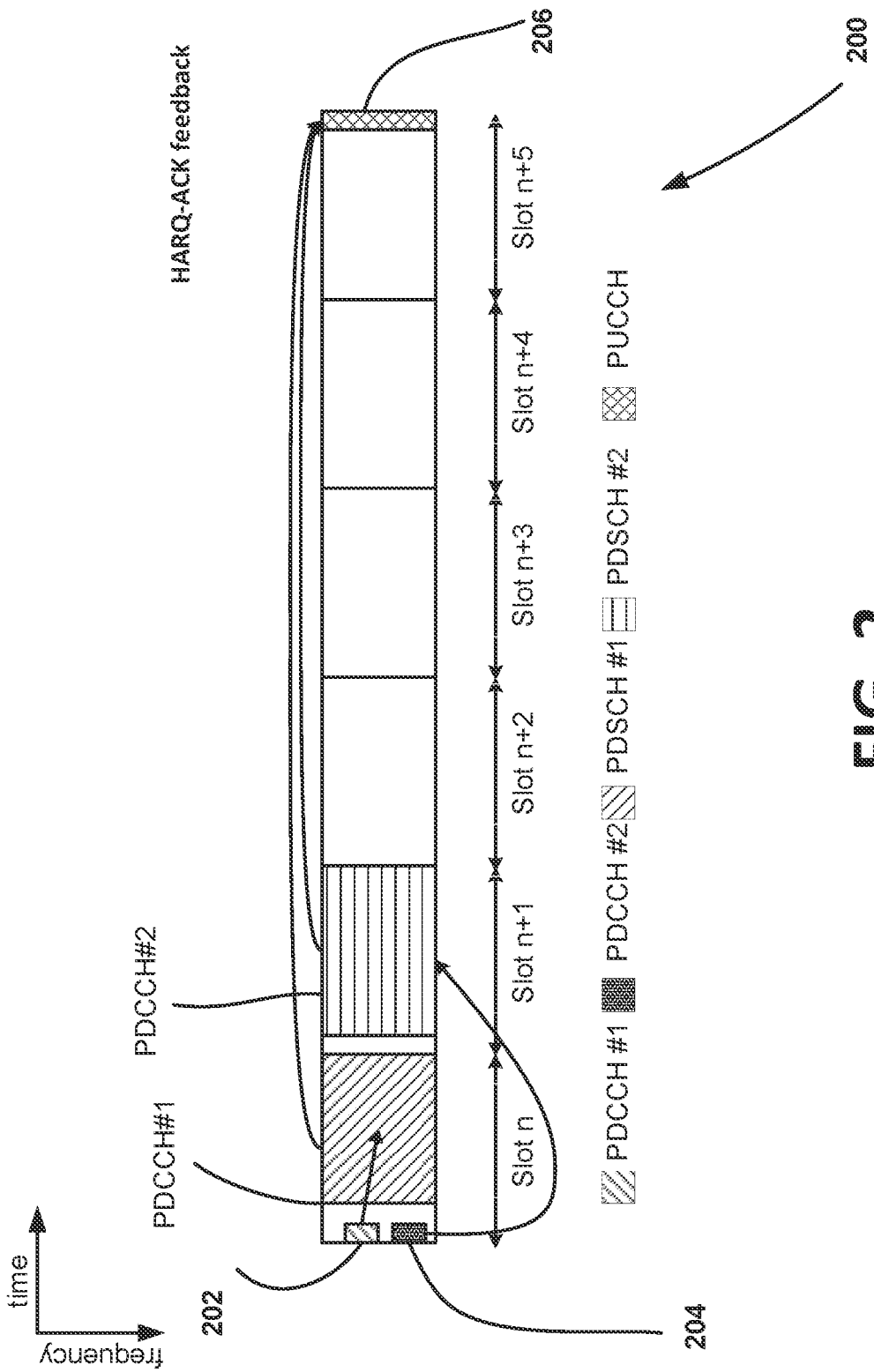
FIG. 2 illustrates radio transmissions showing an example of a physical uplink control channel (PUCCH) resource allocation when multiple DC's are transmitted in a slot.

FIG. 2 illustrates radio transmissions 200 within 6 slots as shown, with example of PUCCH resource allocation when multiple DC's 202 and 204 are transmitted in a slot. In FIG. 2, multiple DC's 202 and 204 can be transmitted in the same slot, for example, slot n. When HARQ-ACK feedbacks 206 for PDSCH #1 and PDSCH #2 are scheduled in the same slot, the UE needs to know which DCI is the last DCI among the PDCCH#1 or PDCCH#2 in order to determine the PUCCH resource allocation for carrying HARQ-ACK feedback.

The present disclosure provides embodiments that enhance PUCCH resource allocation and HARQ-ACK codebook determination in case of multiple DC's scheduling multiple PDSCHs in a slot. In particular, embodiments include enhancements on PUCCH resource allocation in case of multiple DC's in a slot in a serving cell; and enhancements on HARQ-ACK codebook determination in case of multiple DC's in a slot in a serving cell.

Enhancements on PUCCH Resource Allocation In Case of Multiple DCIs in a Slot in a Serving Cell As mentioned above, in NR, to determine the PUCCH carrying HARQ-ACK feedback, the UE first determines a PUCCH resource set based on a payload size of HARQ-ACK feedback, and subsequently selects the PUCCH resource from the PUCCH resource set in accordance with the PUCCH resource indicator of the last DCI and/or the starting CCE index of the corresponding PDCCH transmission. Note that last DCI is determined in a frequency first and time second manner as follows:

For a PUCCH transmission with HARQ-ACK information, a UE determines a PUCCH resource after determining a set of PUCCH resources for $N_{UCI}$ HARQ-ACK information bits. The PUCCH resource determination is based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes and are then indexed in an ascending order across PDCCH monitoring occasion indexes.

In NR, it was agreed that two or more downlink control information (DCI) can be transmitted in a slot to schedule two or more PDSCH transmissions. In case HARQ-ACK feedbacks for the PDSCHs are scheduled in the same slot, the current mechanism as defined in the specification is not sufficient to identify the PUCCH resource carrying HARQ-ACK feedback.

Embodiments of enhancement on PUCCH resource allocation in case of multiple DC's in a slot in a serving cell are provided as follows:

In one embodiment, when respective HARQ-ACK feedbacks for respective PDSCH transmissions in multiple slots and (component carriers) CCs within a PUCCH group are multiplexed and conveyed in a PUCCH, the UE needs to determine which scheduling PDCCH and corresponding starting CCE index are utilized to derive the PUCCH resource from a PUCCH resource set.

In one option, the UE derives the PUCCH resource from the last received PDCCH in accordance with a priority order, which is defined as CC index>PDCCH monitoring occasion index>control resource set (CORESET) or search space index>starting CCE index of PDCCH transmission.

In another option, the priority order is defined as CC index>CORESET or search space index>starting CCE index of PDCCH transmission>PDCCH monitoring occasion index. In another option, the priority order is defined as CC index>common search space>UE specific search space>search space index>starting CCE index of PDCCH transmission.

In an example of this embodiment, for a PUCCH transmission with HARQ-ACK information, a UE determines a PUCCH resource after determining a set of PUCCH resources for HARQ-ACK information bits, as described in Subclause 9.2.1 of TS 38.213 V15.3.0. Namely, the PUCCH resource determination is based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes, and then indexed in an ascending order across CORESET index, are then indexed in an ascending order of starting CCE index of corresponding PDCCH transmissions, and are then indexed in an ascending order across PDCCH monitoring occasion indexes.

In another example embodiment, for transmission of HARQ-ACK information in a PUCCH by a UE, the UE determines a PUCCH resource after determining a set of PUCCH resources for $N_{UCI}$ HARQ-ACK information bits. The PUCCH resource determination is based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in a descending order across serving cells indexes, then indexed in an ascending order across CORESET index(es), are then indexed in an ascending order of starting CCE index of corrsponding PDCCH transmissions, and are then in an ascending order across PDCCH monitoring occasion indexes.

In an alternative embodiment to the aforementioned example, the detected DCI formats are first indexed in a descending order across serving cells indexes, then indexed in a descending order across CORESET index(es), then indexed in an ascending order of starting CCE index of corrsponding PDCCH transmissions, and are then in an ascending order across PDCCH monitoring occasion indexes.

In another alternative to the aforementioned example(s), the detected DCI formats are first indexed in a descending order across serving cells indexes, then indexed in a descending order across CORESET index(es), then indexed in a descending order of starting CCE index of corrsponding PDCCH transmissions, and are then in an ascending order across PDCCH monitoring occasion indexes.

In yet another alternative to the aforementioned example(s), the detected DCI formats are first indexed in a descending order across serving cells indexes, then indexed in a descending order across CORESET index(es), then indexed in a descending order of starting CCE index of corrsponding PDCCH transmissions, and are then in a descending order across PDCCH monitoring occasion indexes.

In various embodiments, the priority order may be defined as any permutation of the above parameters.

FIG. 3 illustrates a radio transmission 300 showing one example of priority order for PUCCH resource determination. In the example, two DC's for scheduling PDSCH transmission are scheduled in CORESET#0 and #1, respectively in the same slot. Based on some of the example priority rules as defined above, the UE would determine the PUCCH resource in accordance with DCI in CORESET #0.

FIG. 4 illustrates a radio transmission 400 showing another example of priority order for PUCCH resource determination. In the example, two DC's for scheduling PDSCH transmission are scheduled in the same CORESET in the same slot. Based on some of the example priority rules as defined above, given that the starting CCE of DCI#0 is smaller than that of DCI#1, the UE would determine the PUCCH resource in accordance with DCI#0, i.e., with a lower starting CCE index.

FIG. 5 illustrates a radio transmission 500 showing another example of priority order for PUCCH resource determination. Note that PDCCH monitoring occasion may be defined as the ending symbol of a PDCCH transmission. In the example, two DC's for scheduling PDSCH transmission are scheduled in CORESET#0 and #1, respectively, in the same slot. Based on some of the priority rules as defined above, where PDCCH in CORESET#1 has a later ending symbol than that in CORESET#0, the UE would determine the PUCCH resource in accordance with DCI in CORESET #1.

In an embodiment, two PDCCHs may only be identified based on ending symbol of the CORESET (for the PDCCH transmission) only when the two PDCCHs share the same starting symbol.

In another embodiment, the priority order may include the search space set index to determine the PUCCH resource. In particular, a UE may derive the PUCCH resource from the last received PDCCH in accordance with a priority order, which is defined as CC index>PDCCH monitoring occasion index>CORESET index>search space set index. Note that the priority order may be defined as any permutation of the above parameters.

In another embodiment, the priority order may include the starting physical resource block (PRB) index of PDCCH transmissions to determine a PUCCH resource. In particular, a UE may derive the PUCCH resource from the last received PDCCH in accordance with a priority order, which is defined as CC index>PDCCH monitoring occasion index>starting PRB index for the scheduling PDCCH. Alternatively, it can be defined as CC index>starting PRB index for the sched-uling PDCCH>PDCCH monitoring occasion index. Note that the priority order may be defined as any permutation of the above parameters.

In another embodiment, in case of multi-transmission reception point (TRP) based transmission, where multiple TRPs may transmit the DC's in the same slot, the TRP index may be included in the priority order to determine PUCCH resource for carrying combined HARQ-ACK feedback from PDSCHs from different TRPs.

In one option, the priority order may be defined as CC index>PDCCH monitoring occasion index>control resource set (CORESET) index>starting CCE index of PDCCH transmission>TRP index.

In another option, CC index>CORESET index>starting CCE index of PDCCH transmission>PDCCH monitoring occasion index>TRP index.

Note that the priority order may be defined as any permutation of the above parameters.

Enhancement on Type 1 and Type 2 HARQ-ACK Codebook Determination

According to the present disclosure, techniques for determination of the number of HARQ-ACK bits for PDSCH or semi-persistent scheduling (SPS) release on multiple CCs are described. The ordering of HARQ-ACK bits may be determined based on a set of information, which at least includes the serving cell index, control resource set (CORESET) index, the start time and/or duration and/or end time of the search space set associated with a PDCCH monitoring occasion and lowest control channel element (CCE) index.

In some embodiments, the set of PDCCH monitoring occasions for DCI format 1_0 or DCI format 1_1 for scheduling PDSCH receptions or SPS release may be first ordered in increasing order of serving cell index, and then in increasing order of CORESET index, and then in ascending order of start time of the search space set associated (i.e. lower HARQ-ACK bit index corresponds to earlier PDCCH with DCI format 1_0 or DCI format 1 monitoring occasion), and then in increasing order of lowest CCE index associated with the detected DCI format. Other combinations of these elements with different orders may be also considered to concatenate the HARQ-ACK bits. In some other embodiments, the search space set index can be further considered to determine the HARQ-ACK bits order if it is allowed to configure different PDCCH monitoring occasions causing partial time-domain overlapping for a same CORESET.

Figure 6:
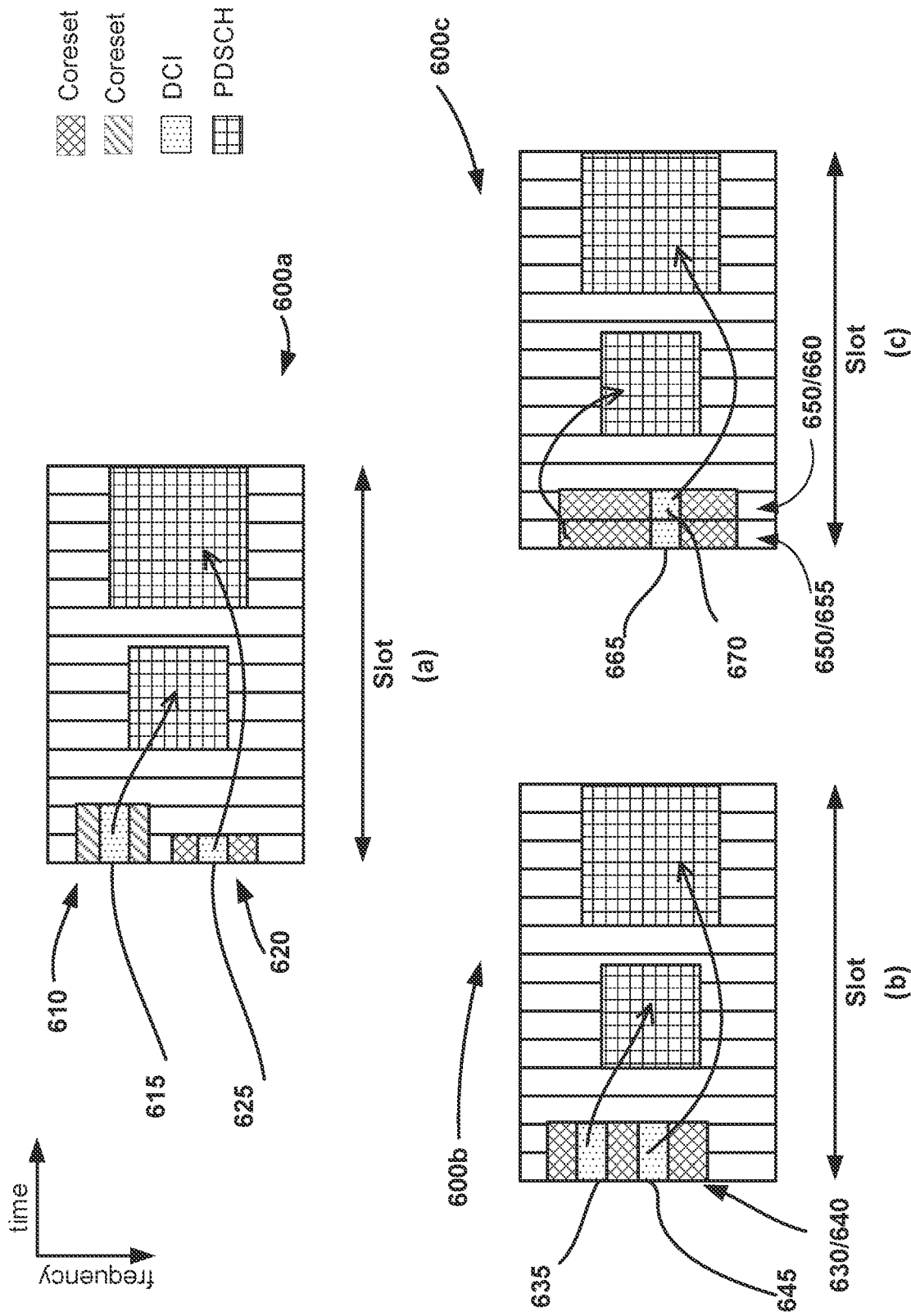
FIG. 6 illustrates three radio transmissions at respective scenarios (a), (b) and (c) showing examples of determining HARQ-ACK bits number and ordering for cases with multiple DC's within a single component carrier (CC) according to one embodiment.

FIG. 6 shows three radio transmissions 600a, 600b and 600c at respective scenarios (a), (b) and (c) showing examples of determining HARQ-ACK bits number and ordering for the cases with multiple DC's within a single CC.

In scenario (a) of FIG. 6, DCI format 615 and 625 were transmitted to a UE in separate CORESETs 610 and 620 respectively, which is associated with a HARQ-ACK bit for each DCI format. Assuming the index of CORESET 610<index of CORESET 620, the HARQ-ACK bits may be ordered as follows:

<b0, b1>, where 'b0' is HARQ-ACK bit associated with PDSCH scheduled by DCI format 615 in CORESET 610; and 'b1' is HARQ-ACK bit associated with PDSCH scheduled by DCI format 625 in CORESET 620.

Unlike scenario (a), in scenario (b) of FIG. 6, two DCI formats 635 and 645 are transmitted within a same CORESET 630 as well as a same search space set (SSS) 640. Given the CCE index of DCI format 635<CCE index of DCI format 645, the 2-bit HARQ-ACK feedback are ordered as follows:

<b0, b1>, where 'b0' is HARQ-ACK bit associated with PDSCH scheduled by DCI format 635; and 'b1' is HARQ-ACK bit associated with PDSCH scheduled by DCI format 645.

In scenario (c) of FIG. 6, two DCI formats 665 and 670 were carried in a same CORESET 650 but in different search space sets (i.e. SSS 655 and SSS 660 respectively). Using the disclosure, the 2-bit HARQ-ACK feedback are ordered as follows as the start of SSS 655 is earlier than that of SSS 660:

<b0, b1>, where 'b0' is HARQ-ACK bit associated with PDSCH scheduled by DCI format 665; and 'b1' is HARQ-ACK bit associated with PDSCH scheduled by DCI format 670.

The same approach (e.g., depending on the serving cell index, CORESET index, the start time and/or duration and/or end time of the search space set associated with a PDCCH monitoring occasion and lowest CCE index) can be applied for ordering the PDCCH monitoring occasion in case of Type-2 HARQ-ACK codebook size determination, which impacts the determination of values of Counter DAI and total DAI in DCI formats.

DCI Formats

DCI Format 1_0

DCI format 1_0 is used for the scheduling of PDSCH in one DL cell.

The following information is transmitted by means of the DCI format 1_0 with CRC scrambled by C-RNTI or CS-RNTI or new-RNTI:

Identifier for DCI formats—1 bits
 The value of this bit field is always set to 1, indicating a DL DCI format
Frequency domain resource assignment—$\lceil \log_2 (N_{RB}^{DLBWP}(N_{RB}^{DLBWP}+1)/2)\rceil$ bits
 $N_{RB}^{DLBWP}$ is the size of the active DL bandwidth part in case DCI format 1_0 is monitored in the UE specific search space and satisfying
 the total number of different DCI sizes monitored per slot is no more than 4 for the cell, and
 the total number of different DCI sizes with C-RNTI monitored per slot is no more than 3 for the cell
otherwise, $N_{RB}^{DLBWP}$ is the size of the initial DL bandwidth part.

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex
UL/SUL indicator—1 bit. If the value of the "Random Access Preamble index" is not all zeros and if the UE is configured with SUL in the cell, this field indicates which UL carrier in the cell to transmit the PRACH according to Table 7.3.1.1.1-1; otherwise, this field is reserved
SS/PBCH index—6 bits. If the value of the "Random Access Preamble index" is not all zeros, this field indicates the SS/PBCH that shall be used to determine the RACH occasion for the PRACH transmission; otherwise, this field is reserved.
PRACH Mask index—4 bits. If the value of the "Random Access Preamble index" is not all zeros, this field indicates the RACH occasion associated with the SS/PBCH indicated by "SS/PBCH index" for the PRACH transmission; otherwise, this field is reserved Reserved bits—10 bits
Otherwise, all remaining fields are set as follows:
Time domain resource assignment—4 bits
VRB-to-PRB mapping—1 bit
Modulation and coding scheme—5 bits
New data indicator—1 bit
Redundancy version—2 bits
HARQ process number—4 bits
Downlink assignment index—2 bits as counter DAI
TPC command for scheduled PUCCH—2 bits
PUCCH resource indicator—3 bits
PDSCH-to-HARQ_feedback timing indicator—3 bits The following information is transmitted by means of the DCI format 1_0 with CRC scrambled by P-RNTI:
Short Messages Indicator—2 bits according to Table DCI-1.
Short Messages—[8] bits. If only the scheduling information for Paging is carried, this bit field is reserved.
Frequency domain resource assignment—$\lceil \log_2 (N_{RB}^{DLBWP}(N_{RB}^{DLBWP}+1)/2)\rceil$ bits. If only the short message is carried, this bit field is reserved.
 $N_{RB}^{DLBWP}$ is the size of the initial DL bandwidth part
Time domain resource assignment—4 bits. If only the short message is carried, this bit field is reserved.
VRB-to-PRB mapping—1 bit. If only the short message is carried, this bit field is reserved.
Modulation and coding scheme—5 bits. If only the short message is carried, this bit field is reserved.
TB scaling—2 bits. If only the short message is carried, this bit field is reserved.
Reserved bits—6 bits The following information is transmitted by means of the DCI format 1_0 with CRC scrambled by SI-RNTI:
Frequency domain resource assignment—$\lceil \log_2 (N_{RB}^{DLBWP}(N_{RB}^{DLBWP}+1)/2\rceil$ bits
 $N_{RB}^{DLBWP}$ is the size of the initial DL bandwidth part
Time domain resource assignment—4 bits
VRB-to-PRB mapping—1 bit
Modulation and coding scheme—5 bits
Redundancy version—2 bits
Reserved bits—[16] bits The following information is transmitted by means of the DCI format 1_0 with CRC scrambled by RA-RNTI:
Frequency domain resource assignment—$\lceil \log_2 (N_{RB}^{DLBWP}(N_{RB}^{DLBWP}+1)/2\rceil$ bits
 $N_{RB}^{DLBWP}$ is the size of the initial DL bandwidth part
Time domain resource assignment—4 bits
VRB-to-PRB mapping—1 bit
Modulation and coding scheme—5 bits
TB scaling—2 bits
Reserved bits—16 bits The following information is transmitted by means of the DCI format 1_0 with CRC scrambled by TC-RNTI:
Identifier for DCI formats—1 bit
 The value of this bit field is always set to 1, indicating a DL DCI format
Frequency domain resource assignment—$\lceil \log_2 (N_{RB}^{DLBWP}(N_{RB}^{DLBWP}+1)/2\rceil$ bits
 $N_{RB}^{DLBWP}$ is the size of the initial DL bandwidth part
Time domain resource assignment—4 bits
VRB-to-PRB mapping—1 bit
Modulation and coding scheme—5 bits
New data indicator—1 bit
Redundancy version—2 bits
HARQ process number-4 bits Downlink assignment index—2 bits, reserved
TPC command for scheduled PUCCH—2 bits
PUCCH resource indicator—3 bits
PDSCH-to-HARQ_feedback timing indicator—3 bits
If DCI format 1_0 is monitored in UE specific search space and satisfies both of the following
 the total number of different DCI sizes monitored per slot is no more than 4 for the cell, and
 the total number of different DCI sizes with C-RNTI monitored per slot is no more than 3 for the cell
and if the number of information bits in the DCI format 1_0 prior to padding is less than the payload size of the DCI format 0_0 monitored in UE specific search space for scheduling the same serving cell, zeros shall be appended to the DCI format 1_0 until the payload size equals that of the DCI format 0_0.

TABLE DCI-1

| Short Message indicator | |
|---|---|
| Bit field | PUSCH frequency hopping |
| 00 | Reserved |
| 01 | Only scheduling information for Paging is present in the DCI |
| 10 | Only short message is present in the DCI |
| 11 | Both scheduling information for Paging and short message are present in the DCI |

DCI Format 1_1
DCI format 1_1 is used for the scheduling of PDSCH in one cell.
The following information is transmitted by means of the DCI format 1_1 with CRC scrambled by C-RNTI or CS-RNTI or new-RNTI:
 Identifier for DCI formats—1 bits
  The value of this bit field is always set to 1, indicating a DL DCI format
 Carrier indicator—0 or 3 bits.
 Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  $n_{BWP}=n_{BWP,RRC}+1$ if $n_{BWP,RRC} \leq 3$, in which case the bandwidth part indicator is equivalent to the higher layer parameter BWP-Id;
  otherwise $n_{BWP}=n_{BWP,RRC}$, in which case the bandwidth part indicator;
  If a UE does not support active BWP change via DCI, the UE ignores this bit field.
 Frequency domain resource assignment—number of bits determined by the following, where $N_{RB}^{DL,BWP}$ is the size of the active DL bandwidth part:
  $N_{RBG}$ bits if only resource allocation type 0 is configured, where $N_{RBG}$,
  $\lceil \log_2(N_{RB}^{DL,BWP}(N_{RB}^{DL,BWP}+1)/2) \rceil$ bits if only resource allocation type 1 is configured, or
  max ($\lceil \log_2(N_{RB}^{DL,BWP}(N_{RB}^{DL,BWP}+1)/2) \rceil$, $N_{RBG}$)+1 bits if both resource allocation type 0 and 1 are configured.
  If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation.
  For resource allocation type 1, the $\lceil \log_2(N_{RB}^{DL,BWP}(N_{RB}^{DL,BWP}+1)/2) \rceil$ LSBs provide the resource allocation
 If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
 Time domain resource assignment—0, 1, 2, 3, or 4 bits. The bitwidth for this field is determined as $\lceil \log_2(I) \rceil$ bits, where I is the number of entries in the higher layer parameter pdsch-AllocationList.
 VRB-to-PRB mapping—0 or 1 bit:
  0 bit if only resource allocation type 0 is configured;
  1 bit or only applicable to resource allocation type 1.
 PRB bundling size indicator—0 bit if the higher layer parameter prb-BundlingType is not configured or is set to 'static', or 1 bit if the higher layer parameter prb-BundlingType is set to 'dynamic'.
 Rate matching indicator—0, 1, or 2 bits according to higher layer parameter rateMatchPattern.
 ZP CSI-RS trigger—0, 1, or 2 bits. The bitwidth for this field is determined as $\lceil \log_2(n_{ZP}+1) \rceil$ bits, where $n_{ZP}$ is the number of ZP CSI-RS resource sets in the higher layer parameter zp-CSI-RS-Resource.
 For transport block 1:
 Modulation and coding scheme—5 bits
 New data indicator—1 bit
 Redundancy version—2 bits
 For transport block 2 (only present if maxNrofCodeWordsScheduledByDCI equals 2):
 Modulation and coding scheme—5 bits
 New data indicator—1 bit
 Redundancy version—2 bits
 If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2, and the UE ignores the "Modulation and coding scheme", "New data indicator", and "Redundancy version" fields of transport block 2 for the indicated bandwidth part.
 HARQ process number—4 bits
 Downlink assignment index—number of bits as defined in the following
  4 bits if more than one serving cell are configured in the DL and the higher layer parameter pdsch-HARQ-ACK-Codebook=dynamic, where the 2 MSB bits are the counter DAI and the 2 LSB bits are the total DAI;
  2 bits if only one serving cell is configured in the DL and the higher layer parameter pdsch-HARQ-ACK-Codebook=dynamic, where the 2 bits are the counter DAI;
  0 bits otherwise.
 TPC command for scheduled PUCCH—2 bits
 PUCCH resource indicator—3 bits
 PDSCH-to-HARQ_feedback timing indicator—0, 1, 2, or 3 bits. The bitwidth for this field is determined as ⌈log₂(I)⌉ bits, where I is the number of entries in the higher layer parameter dl-DataToUL-ACK.

Antenna port(s)—4, 5, or 6 bits, where the number of CDM groups without data of values 1, 2, and 3 refers to CDM groups {0}, {0,1}, and {0, 1,2} respectively. The antenna ports {p₀, . . . , p_{v-1}} shall be determined according to the ordering of DMRS port(s).

If a UE is configured with both dmrs-DownlinkForPDSCH-MappingTypeA and dmrs-DownlinkForPDSCH-MappingTypeB, the bitwidth of this field equals max{$x_A$, $x_B$}, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A-x_B|$ zeros are padded in the MSB of this field, if the mapping type of the PDSCH corresponds to the smaller value of $x_A$ and $X_B$.

Transmission configuration indication—0 bit if higher layer parameter tci-PresentInDCI is not enabled; otherwise 3 bits.

If "Bandwidth part indicator" field indicates a bandwidth part other than the active bandwidth part and the "Transmission configuration indication" field is not present in the DCI format 1_1, the UE assumes tci-PresentInDCI is not enabled for the indicated bandwidth part.

SRS request—2 bits for UEs not configured with SUL in the cell; 3 bits for UEs configured SUL in the cell where the first bit is the non-SUL/SUL indicator and the second and third bits. This bit field may also indicate the associated CSI-RS.

CBG transmission information (CBGTI)—0, 2, 4, 6, or 8 bits determined by the higher layer parameters maxCodeBlockGroupsPerTransportBlock and Number-MCS-HARQ-DL-DCI for the PDSCH.

CBG flushing out information (CBGFI)—0 or 1 bit determined by higher layer parameter codeBlockGroup-FlushIndicator.

DMRS sequence initialization—1 bit if both scramblingID0 and scramblingID1 are configured in DMRS-DownlinkConfig for $n_{SCID}$ selection; 0 bit otherwise.

If DCI formats 1_1 are monitored in multiple search spaces associated with multiple CORESETs in a BWP, zeros shall be appended until the payload size of the DCI formats 1_1 monitored in the multiple search spaces equal to the maximum payload size of the DCI format 1_1 monitored in the multiple search spaces.

Uplink Control Information (UCI)

In various embodiments, Uplink Control Information (UCI) feedback includes Hybrid Automatic Repeat Request (HARQ)-Acknowledgement (ACK) bits, Scheduling Request (SR) bits (and/or positive SR bits), periodic or aperiodic Channel State Information (CSI), and/or beam related information (e.g., L1-RSRP or other like beam information). A UE may generate the UCI and transmit the UCI on a PUCCH or a PUSCH using one of a plurality of PUCCH formats, where the particular PUCCH format used depends on the number of configured serving cells and/or whether or not simultaneous PUSCH and PUCCH transmissions are configured.

For example, if the UE is configured for a single serving cell and is not configured for simultaneous PUSCH and PUCCH transmissions, then in subframe n, UCI may be transmitted on PUCCH using format 1/1a/1b/3 or 2/2a/2b if the UE is not transmitting PUSCH; or on PUSCH if the UE is transmitting PUSCH in subframe n unless the PUSCH transmission corresponds to a Random Access Response Grant or a retransmission of the same transport block as part of the contention based random access procedure, in which case UCI is not transmitted.

In another example, if the UE is configured for a single serving cell and simultaneous PUSCH and PUCCH transmission, then in subframe n UCI may be transmitted: on PUCCH using format 1/1a/1b/3 if the UCI includes only of HARQ-ACK and/or SR; on PUCCH using format 2 if the UCI includes only of periodic CSI; on PUCCH using format 2/2a/2b/3 if the UCI includes periodic CSI and HARQ-ACK and if the UE is not transmitting PUSCH; or on PUCCH and PUSCH if the UCI includes HARQ-ACK/HARQ-ACK+SR/positive SR and periodic/aperiodic CSI and if the UE is transmitting PUSCH in subframe n, in which case the HARQ-ACK/HARQ-ACK+SR/positive SR is transmitted on PUCCH using format 1/1a/1b/3 and the periodic/aperiodic CSI transmitted on PUSCH unless the PUSCH transmission corresponds to a Random Access Response Grant or a retransmission of the same transport block as part of the contention based random access procedure, in which case periodic/aperiodic CSI is not transmitted.

In another example, if the UE is configured with more than one serving cell and is not configured for simultaneous PUSCH and PUCCH transmission, then in subframe n UCI may be transmitted on PUCCH using format 1/1a/1b/3/4/5 or 2/2a/2b if the UE is not transmitting PUSCH; on PUSCH of the serving cell if the UCI includes aperiodic CSI or aperiodic CSI and HARQ-ACK; on primary cell PUSCH if the UCI includes periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted; or on PUSCH of the secondary cell with smallest SCellIndex if the UCI includes periodic CSI and/or HARQ-ACK and if the UE is not transmitting PUSCH on primary cell but is transmitting PUSCH on at least one secondary cell.

In another example, if the UE is configured with more than one serving cell and simultaneous PUSCH and PUCCH transmission, then in subframe n UCI may be transmitted on PUCCH using format 1/1a/1b/3 if the UCI includes only of HARQ-ACK and/or SR; on PUCCH using format 4/5 if the UCI includes only of HARQ-ACK and/or SR and/or periodic CSI; on PUCCH using format 2 if the UCI includes only of periodic CSI corresponding to one serving cell; if the UCI includes periodic CSI and HARQ-ACK and if the UE is not transmitting on PUSCH; on PUCCH and primary cell PUSCH if the UCI includes HARQ-ACK and periodic CSI and the UE is transmitting PUSCH on the primary cell, in which case the HARQ-ACK is transmitted on PUCCH using format 1a/1b/3 and the periodic CSI is transmitted on PUSCH unless the primary cell PUSCH transmission corresponds to a Random Access Response Grant or a retransmission of the same transport block as part of the contention based random access procedure, in which case periodic CSI is not transmitted; on PUCCH and PUSCH of the secondary cell with the smallest SCellIndex if the UCI includes HARQ-ACK and periodic CSI and if the UE is not transmitting PUSCH on primary cell but is transmitting PUSCH on at least one secondary cell, in which case, the HARQ-ACK is transmitted on PUCCH using format 1a/1b/3 and the periodic CSI is transmitted on PUSCH; and/or on PUCCH and PUSCH if the UCI includes HARQ-ACK/HARQ-ACK+SR/positive SR and aperiodic CSI in which case the HARQ-ACK/HARQ-ACK+SR/positive SR is transmitted on PUCCH using format 1/1a/1b/3 and the aperiodic CSI is transmitted on PUSCH of the serving cell.

In addition to the above, the following combinations of UCI on PUCCH are supported according to some embodiments:

- PUCCH Format 1a for 1-bit HARQ-ACK or in case of FDD or FDD-TDD primary cell frame structure type 1 for 1-bit HARQ-ACK with positive SR.
- PUCCH Format 1b for 2-bit HARQ-ACK or for 2-bit HARQ-ACK with positive SR.
- PUCCH Format 1b for up to 4-bit HARQ-ACK with channel selection when the UE is configured with more than one serving cell or, in the case of TDD, when the UE is configured with a single serving cell.
- PUCCH Format 1 for positive SR.
- PUCCH Format 2 for a CSI report when not multiplexed with HARQ-ACK.
- PUCCH Format 2a for a CSI report multiplexed with 1-bit HARQ-ACK for normal cyclic prefix.
- PUCCH Format 2b for a CSI report multiplexed with 2-bit HARQ-ACK for normal cyclic prefix.
- PUCCH Format 2 for a CSI report multiplexed with HARQ-ACK for extended cyclic prefix.
- For subframe-PUCCH, PUCCH format 3 for up to 10-bit HARQ-ACK for FDD or FDD-TDD primary cell frame structure type 1 and for up to 20-bit HARQ-ACK for TDD and for up to 21 bit HARQ-ACK for FDD-TDD primary cell frame structure type 2.
- For subframe-PUCCH, PUCCH format 3 for up to 11-bit corresponding to 10-bit HARQ-ACK and 1-bit positive/negative SR for FDD or FDD-TDD and for up to 21-bit corresponding to 20-bit HARQ-ACK and 1-bit positive/negative SR for TDD and for up to 22-bit corresponding to 21-bit HARQ-ACK and 1-bit positive/negative SR for FDD-TDD primary cell frame structure type 2.
- For subframe-PUCCH, PUCCH format 3 for HARQ-ACK, 1-bit positive/negative SR (if any) and CSI report(s).
- For subframe-PUCCH, PUCCH format 3 for up to 22 bits of UCI including HARQ-ACK, SR (if any) and periodic CSI report(s) (if any) for UE configured with Format 4 or Format 5 or for UE configured with more than 5 serving cells.
- For slot-PUCCH, PUCCH Format 3 for up to 11-bits of UCI including HARQ-ACK, SR.
- For subframe-PUCCH, PUCCH format 4 for more than 22 bits of UCI including HARQ-ACK, SR (if any) and periodic CSI report(s) (if any).
- For slot-PUCCH, PUCCH Format 4 for more than 11 bits of UCI including HARQ-ACK, SR (if any) for UE configured with slot-PUCCH format 3.
- For slot-PUCCH, PUCCH Format 4 for more than 2 bits of UCI including HARQ-ACK, SR (if any) for UE not configured with slot-PUCCH format 3.
- For subslot-PUCCH, PUCCH Format 4 for more than 3 bits of UCI including HARQ-ACK, SR (if any).
- For subframe-PUCCH, PUCCH format 5 for more than 22 bits of UCI including HARQ-ACK, SR (if any) and periodic CSI report(s) (if any).
- For subframe-PUCCH, PUCCH Format 4 for more than one CSI report, SR (if any) and HARQ-ACK corresponding to PDSCH transmission only on the primary cell (if any).
- For subframe-PUCCH, PUCCH format 5 for more than one CSI report, SR (if any) and HARQ-ACK corresponding to PDSCH transmission only on the primary cell (if any).

Coding Schemes

Data and control streams from/to a medium access control (MAC) layer are encoded/decoded to offer transport and control services over the radio transmission link. UCI may be encoded/decoded according to a particular coding scheme, which is based in part on the number of bits to be included in the UCI, the types of information to be included in the UCI, and/or the number of configured serving cells. A channel coding scheme is a combination of error detection, error correcting, rate matching, interleaving, and transport channel or control information mapping onto/splitting from physical channels. The coding schemes that may be used to encode UCI for Long Term Evolution (LTE) implementations include tail biting convolutional coding and block coding. The coding schemes that may be used to encode UCI for NR implementations include block coding and polar coding.

For channel coding UCI for transmission over the PUCCH or PUSCH, data arrives to a coding unit in the form of indicators for measurement indication, scheduling request and HARQ acknowledgement.

Referring to FIG. 7, which shows a flow diagram 700 to encode UCI according to an embodiment, where three forms of channel coding may be used. The first form of channel coding is for HARQ-ACK and for combination of HARQ-ACK and periodic channel state information (CSI) transmitted on PUCCH format 3, including the cases with scheduling request. The second form of channel coding is for the channel quality information/precoding matrix indicator (CQI/PMI) transmitted on PUCCH format 2, and the third form of channel coding is for combination of CQI/PMI and HARQ-ACK transmitted on PUCCH format 2/2a/2b.

Referring to FIG. 8, which shows a flow diagram 800 to encode UCI according to another embodiment, a fourth form of channel coding is used for HARQ-ACK and for combination of HARQ-ACK and periodic CSI transmitted on PUCCH format 4 or PUCCH format 5 including the cases with scheduling request, or for periodic CSI transmitted on PUCCH format 4 or PUCCH format 5 including the cases with scheduling request. According to FIG. 8, a first operation 802 to encode the UCI may include cyclic redundancy check (CRC) attachment, a second operation 804 may include channel coding, and a third operation 806 may including rate matching.

HARQ-ACK Reporting Procedures

According to one embodiment, the UE does not expect to transmit more than one PUCCH with HARQ-ACK information in a slot.

According to an embodiment, or DCI format 1_0, the PDSCH-to-HARQ-timing-indicator field values map to {1, 2, 3, 4, 5, 6, 7, 8}. For DCI format 1_1, if present, the PDSCH-to-HARQ-timing-indicator field values map to values for a set of number of slots provided by higher layer parameter dl-DataToUL-ACK as defined in Table HARQ-1 below.

According to an embodiment, for a SPS PDSCH reception in slot n, the UE transmits the PUCCH in slot n+k where k is provided by the PDSCH-to-HARQ-timing-indicator field in DCI format 1_0 or, if present, in DCI format 1_1 activating the SPS PDSCH reception.

According to an embodiment, if the UE detects a DCI format 1_1 that does not include a PDSCH-to-HARQ-timing-indicator field and schedules a PDSCH reception or activates a SPS PDSCH reception in slot n, the UE provides corresponding HARQ-ACK information in a PUCCH transmission within slot n+k where k is provided by higher layer parameter dl-DataToUL-ACK.

According to an embodiment, with reference to slots for PUCCH transmissions, if the UE detects a DCI format 1_0 or a DCI format 1_1 scheduling a PDSCH reception in slot n or if the UE detects a DCI format 1_0 indicating a SPS PDSCH release through a PDCCH reception in slot n, the UE provides corresponding HARQ-ACK information in a PUCCH transmission within slot n+k, where k is a number of slots and is indicated by the PDSCH-to-HARQ-timing-indicator field in the DCI format, if present, or provided by higher layer parameter dl-DataToUL-ACK. If the PDSCH subcarrier spacing is equal to or larger than the PUCCH subcarrier spacing, k=0 corresponds to the slot of the PUCCH transmission that overlaps with the slot of the PDSCH transmission. If the PDSCH subcarrier spacing is smaller than the PUCCH subcarrier spacing, k=0 corresponds to the slot of the PUCCH transmission that ends at a same time as the slot of the PDSCH reception or of the PDCCH reception in case of SPS PDSCH release.

HARQ-ACK information transmission in a PUCCH may be subject to the limitations for UE transmissions.

TABLE HARQ-1

Mapping of PDSCH-to-HARQ_feedback timing indicator field values to numbers of slots

| PDSCH-to-HARQ_feedback timing indicator | Number of slots k |
| --- | --- |
| '000' | $1^{st}$ value provided by dl-DataToUL-ACK |
| '001' | $2^{nd}$ value provided by dl-DataToUL-ACK |
| '010' | $3^{rd}$ value provided by dl-DataToUL-ACK |
| '011' | $4^{th}$ value provided by dl-DataToUL-ACK |
| '100' | $5^{th}$ value provided by dl-DataToUL-ACK |
| '101' | $6^{th}$ value provided by dl-DataToUL-ACK |
| '110' | $7^{th}$ value provided by dl-DataToUL-ACK |
| '111' | $8^{th}$ value provided by dl-DataToUL-ACK |

For transmission of HARQ-ACK information in a PUCCH by a UE, the UE determines a PUCCH resource after determining a set of PUCCH resources for $N_{UCI}$ HARQ-ACK information bits. The PUCCH resource determination is based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in a descending order across serving cells indexes and are then in an ascending order across PDCCH monitoring occasion indexes.

In some embodiments, the detected DCI formats are first indexed in an ascending order across serving cells indexes, and then indexed in an ascending order across CORESET index, are then indexed in an ascending order of starting CCE index of corresponding PDCCH transmissions, and are then indexed in an ascending order across PDCCH monitoring occasion indexes.

In other embodiments, the detected DCI formats are first indexed in a descending order across serving cells indexes, then indexed in an ascending order across CORESET index(es), are then indexed in an ascending order of starting CCE index of corresponding PDCCH transmissions, and are then in an ascending order across PDCCH monitoring occasion indexes.

In other embodiments, the detected DCI formats are first indexed in a descending order across serving cells indexes, then indexed in a descending order across CORESET index(es), then indexed in an ascending order of starting CCE index of corrsponding PDCCH transmissions, and are then in an ascending order across PDCCH monitoring occasion indexes.

In other embodiments, the detected DCI formats are first indexed in a descending order across serving cells indexes, then indexed in a descending order across CORESET index(es), then indexed in a descending order of starting CCE index of corrsponding PDCCH transmissions, and are then in an ascending order across PDCCH monitoring occasion indexes.

In other embodiments, the detected DCI formats are first indexed in a descending order across serving cells indexes, then indexed in a descending order across CORESET index(es), then indexed in a descending order of starting CCE index of corrsponding PDCCH transmissions, and are then in a descending order across PDCCH monitoring occasion indexes.

According to an embodiment, the PUCCH resource indicator field values map to values of a set of PUCCH resource indexes, as defined in Table HARQ-2 below, provided by higher layer parameter ResourceList for PUCCH resources from a set of PUCCH resources provided by higher layer parameter PUCCH-ResourceSet with a maximum of eight PUCCH resources.

According to an embodiment, for the first set of PUCCH resources and when the size $R_{PUCCH}$ of higher layer parameter resourceList is larger than eight, when a UE provides HARQ-ACK information in a PUCCH transmission in response to detecting a last DCI format 1_0 or DCI format 1_1, the UE determines a PUCCH resource with index $r_{PUCCH}$, $0 \leq r_{PUCCH} \leq R_{PUCCH} - 1$, as given by equation (1) below:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases} \quad \text{Eq. (1)}$$

where $N_{CCE,p}$ is a number of CCEs in control resource set p of a corresponding PDCCH reception for the DCI format 1_0 or DCI format 1_1 as described in Subclause 10.1, $n_{CCE,p}$ is the index of a first CCE for the PDCCH reception, and $\Delta_{PRI}$ is a value of the PUCCH resource indicator field in the DCI format 1_0 or DCI format 1_1.

TABLE HARQ-2

Mapping of PUCCH resource indication field
values to a PUCCH resource in a PUCCH resource
set with maximum 8 PUCCH resources

| PUCCH resource indicator | PUCCH resource |
|---|---|
| '000' | 1st PUCCH resource provided by pucch-ResourceId obtained from the 1st value of resourceList |
| '001' | 2nd PUCCH resource provided by pucch-ResourceId obtained from the 2nd value of resourceList |
| '010' | 3rd PUCCH resource provided by pucch-ResourceId obtained from the 3rd value of resourceList |
| '011' | 4th PUCCH resource provided by pucch-ResourceId obtained from the 4th value of resourceList |
| '100' | 5th PUCCH resource provided by pucch-ResourceId obtained from the 5th value of resourceList |
| '101' | 6th PUCCH resource provided by pucch-ResourceId obtained from the 6th value of resourceList |
| '110' | 7th PUCCH resource provided by pucch-ResourceId obtained from the 7th value of resourceList |
| '111' | 8th PUCCH resource provided by pucch-ResourceId obtained from the 8th value of resourceList |

If a UE transmits HARQ-ACK information corresponding only to a PDSCH reception without a corresponding PDCCH, a PUCCH resource for corresponding HARQ-ACK information transmission is provided by higher layer parameter n1PUCCH-AN.

If a UE transmits HARQ-ACK information using PUCCH format 0, the UE determines values $m_0$ and $m_{CS}$ for computing a value of cyclic shift $\alpha$ where $m_0$ is provided by higher layer parameter initialCyclicShift of PUCCH-format0, and $m_{CS}$ is determined from the value of one HARQ-ACK information bit or from the values of two HARQ-ACK information bits as in Table HARQ-3 and Table HARQ-4 below, respectively.

TABLE HARQ-3

Mapping of one HARQ-ACK information
bit to sequences for PUCCH format 0

| HARQ-ACK Value | 0 | 1 |
|---|---|---|
| Sequence cyclic shift | $m_{cs} = 0$ | $m_{cs} = 6$ |

TABLE HARQ-4

Mapping of two HARQ-ACK information
bits to sequences for PUCCH format 0

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

If a UE transmits HARQ-ACK information using PUCCH format 1, the UE is provided a value for $m_0$ by higher layer parameter initialCyclicShift of PUCCH-format1.

If a UE transmits $O_{ACK}$ HARQ-ACK information bits and $O_{CRC}$ bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs $M_{RB}^{PUCCH}$ provided respectively by higher layer parameter nrofPRBs of PUCCH-format2 or nrofPRBs of PUCCH-format3 and starts from the first PRB from the number of PRBs, that results in equation (2):

$$(O_{ACK}+O_{CRC}) \leq M_{RB,min}^{PUCCH} \cdot N_{sc,ctrl}^{RB} \cdot N_{symb-UCI}^{PUCCH} \cdot Q_m \cdot r,$$

and, if $M_{RB}^{PUCCH} > 1$, $$(O_{ACK}+O_{CRC}) > (M_{RB,min}^{PUCCH}-1) \cdot N_{sc,ctrl}^{RB} \cdot N_{symb-UCI}^{PUCCH} \cdot Q_m \cdot r, \quad \text{Eq. (2)}$$

where $N_{sc,ctrl}^{RB}$, $N_{symb-UCI}^{PUCCH}$, $Q_m$, and r are defined elsewhere. If $(O_{ACK}+O_{CRC}) > (M_{RB}^{PUCCH}-1) \cdot N_{sc,ctrl}^{RB} \cdot N_{symb-UCI}^{PUCCH} \cdot Q_m \cdot r$, the UE transmits the PUCCH over $M_{RB}^{PUCCH}$ PRBs.

Figure 9:
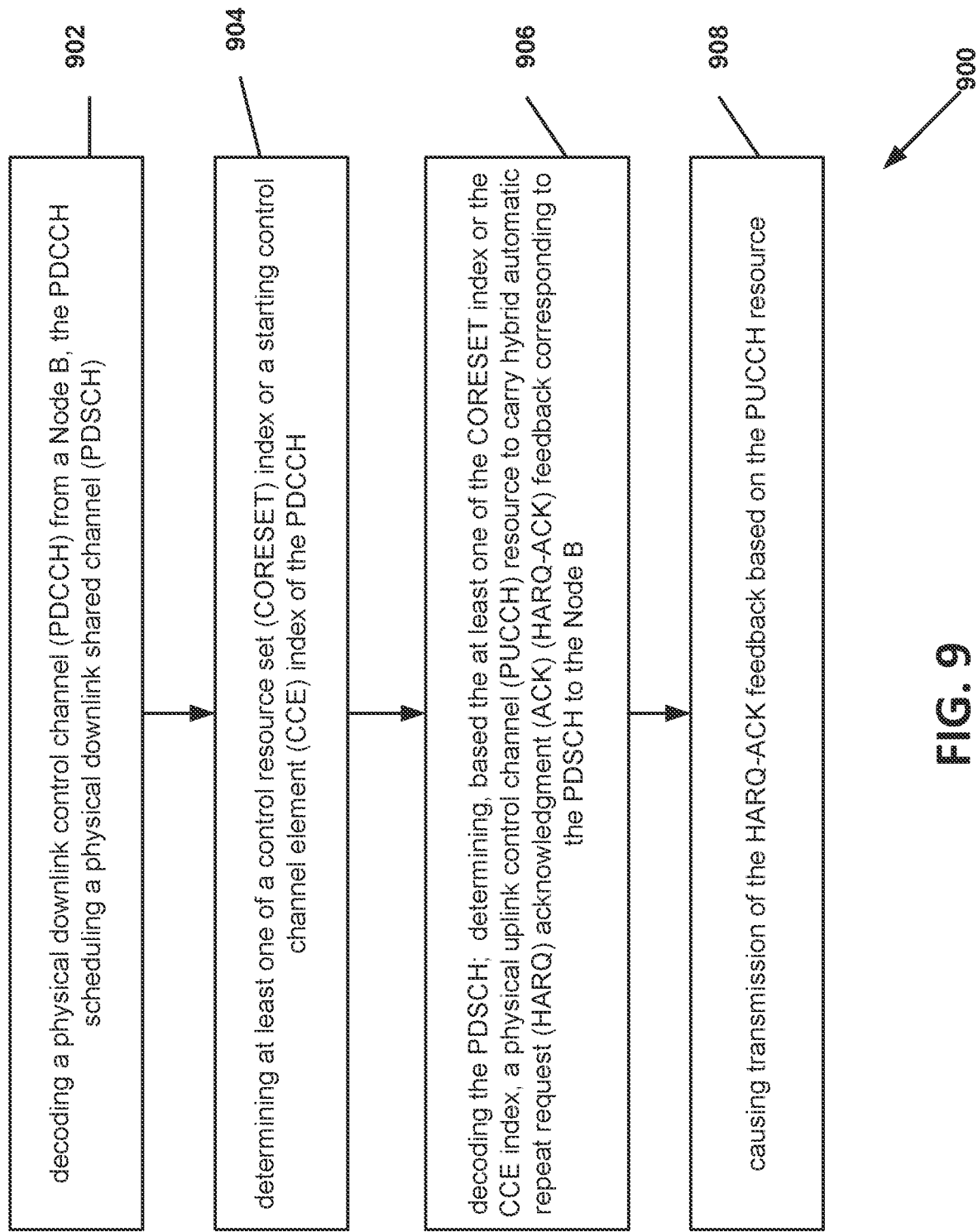
FIG. 9 shows an embodiment of a process.

FIG. 9 includes a process 900 according to an embodiment. Process 900 includes, at operation 902, decoding a physical downlink control channel (PDCCH) from a Node B, the PDCCH scheduling a physical downlink shared channel (PDSCH), at operation 904, determining at least one of a control resource set (CORESET) index or a starting control channel element (CCE) index of the PDCCH; at operation 906, decoding the PDSCH; determining, based the at least one of the CORESET index or the CCE index, a physical uplink control channel (PUCCH) resource to carry hybrid automatic repeat request (HARQ) acknowledgment (ACK) (HARQ-ACK) feedback corresponding to the PDSCH to the Node B; and at operation 908, causing transmission of the HARQ-ACK feedback based on the PUCCH resource.

Figure 10:
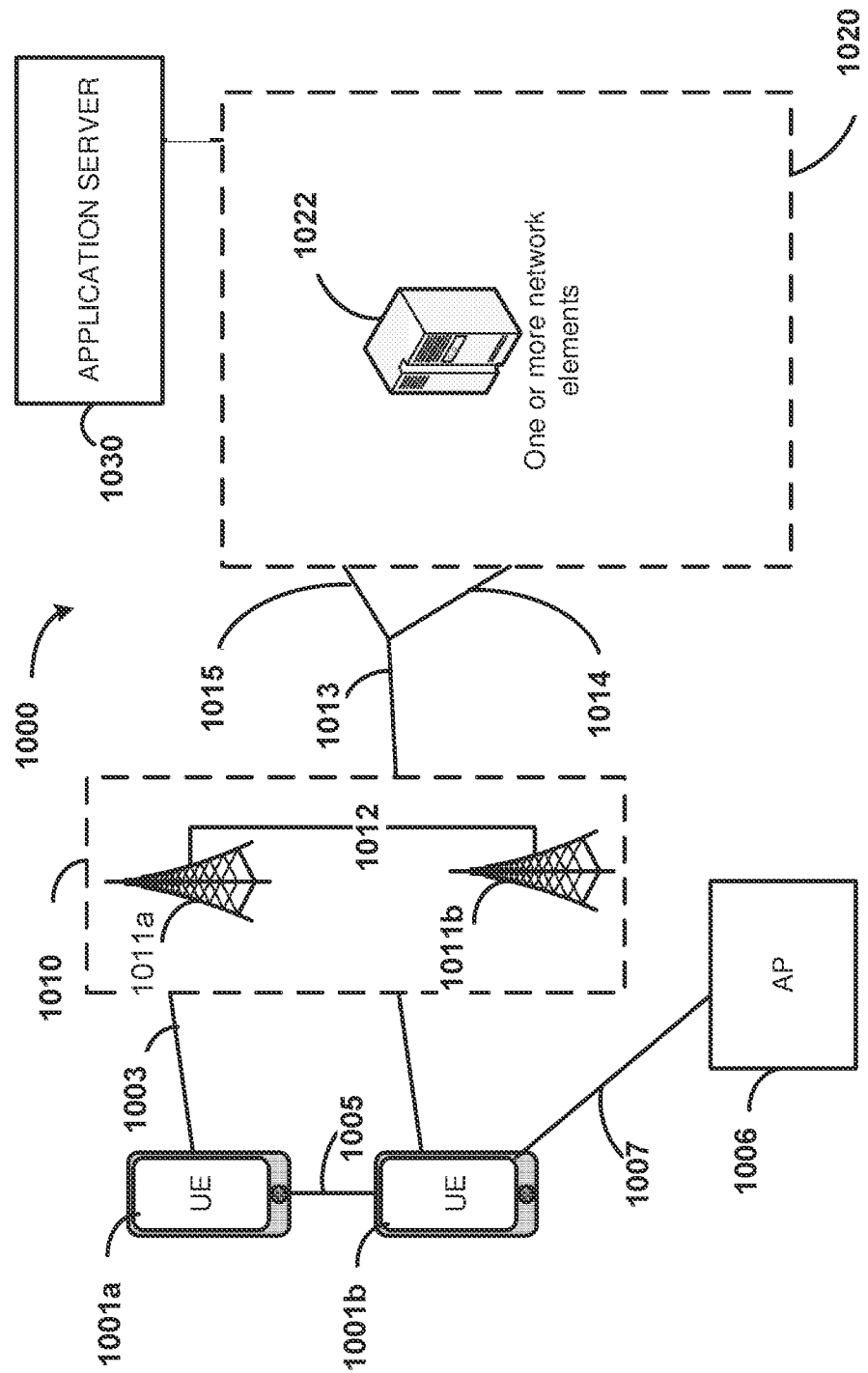
FIG. 10 illustrates an example architecture of a system of a network, in accordance with various embodiments.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1001a and UE 1001b (collectively referred to as "UEs 1001" or "UE 1001"). In this example, UEs 1001 are illustrated as smartphones, but may also comprise any mobile or non-mobile computing device.

The UEs 1001 may be configured to connect, for example, communicatively couple, with an or RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below).

The RAN 1010 can include one or more AN nodes or RAN nodes 1011a and 1011b (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, NR evolved NodeBs (gNodeBs), RAN nodes, eNBs, NodeBs, RSUs, TRxPs or TRPs, and so forth. As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011, 1012 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The RAN nodes 1011 may be configured to communicate with one another via interface 1012. In embodiments where the system 1000 is a 5G or NR system, the interface 1012 may be an Xn interface 1012. The Xn interface is defined between two or more RAN nodes 1011 (e.g., two or more gNodeBs or gNBs and the like) that connect to 5GC 1020, between a RAN node 1011 (e.g., a gNB) connecting to 5GC 1020 and an eNB, and/or between two eNBs connecting to 5GC 1020.

The RAN 1010 is shown to be communicatively coupled to a core network—in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium).

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the S1 control plane (NG-C) interface 1015, which is a signaling interface between the RAN nodes 1011 and AMFs.

In embodiments, the CN 1020 may be a 5G CN (referred to as "5GC 1020" or the like), while in other embodiments, the CN 1020 may be an EPC). Where CN 1020 is an EPC (referred to as "EPC 1020" or the like), the RAN 1010 may be connected with the CN 1020 via an S1 interface 1013. In embodiments, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMEs.

Figure 11:
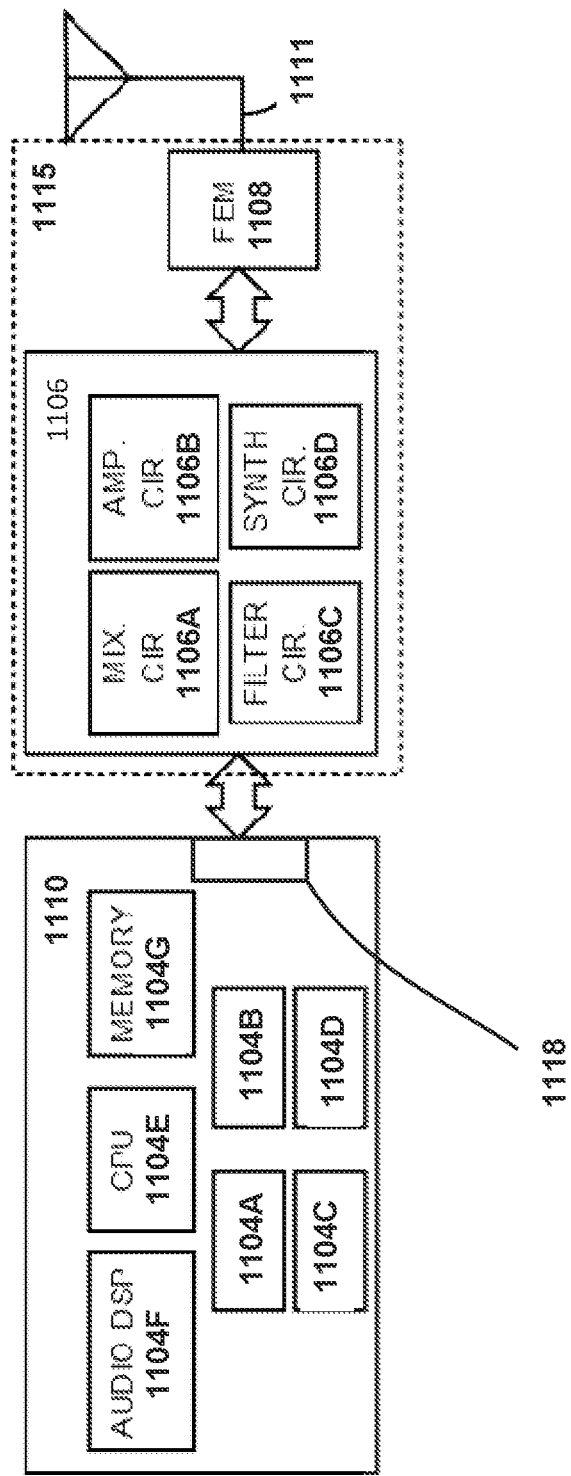
FIG. 11 illustrates example components of baseband circuitry and radio front end modules (RFEM) in accordance with various embodiments.

FIG. 11 illustrates example components of baseband circuitry 1110 and radio front end modules (RFEM) 1115 in accordance with various embodiments. Baseband circuitry 1110 includes a RF interface 1118 connecting it to the RFEM. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1110 may include Fast-Fourier Transform (FFT), precoding, or constellation mapping/demapping functionality. In some embodiments, encoding/decoding circuitry of the baseband circuitry 1110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with an application circuitry for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other embodiments, some or all of the functionality of baseband processors 1104A-D may be included in modules stored in the memory 1104G and executed via a Central Processing Unit (CPU) 1104E. In other embodiments, some or all of the functionality of baseband processors 1104A-D may be provided as hardware accelerators (e.g., FPGAs, ASICs, etc.) loaded with the appropriate bit streams or logic blocks stored in respective memory cells. In various embodiments, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. In addition, the baseband circuitry 1110 includes one or more audio digital signal processor(s) (DSP) 1104F. The audio DSP(s) 1104F include elements for compression/decompression and echo cancellation and may include other suitable processing elements in other embodiments.

In some embodiments, each of the processors 1104A-1104E include respective memory interfaces to send/receive data to/from the memory 1104G. The baseband circuitry 1110 may further include one or more interfaces to communicatively couple to other circuitries/devices RF circuitry 1106 may enable communication with wireless networks using modulated electromagnetic radiation through a non-solid medium.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various embodiments, the amplification through the transmit or receive signal paths may be done solely in the RF circuitry 1106, solely in the FEM circuitry 1108, or in both the RF circuitry 1106 and the FEM circuitry 1108.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

One or more of the components of FIGS. 10 and/or 11, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 10 and/or 11, such as the shown baseband processing circuitry including processing circuitry and a RF interface, may be used in any of the embodiments described herein, such as in a gNodeB or in a UE.

In some embodiments, the electronic device(s), network(s), system(s), chip(s) or component(s), or portions or implementations thereof, of FIGS. 10 and/or 11, or some other figure herein, may be configured to perform one or more processes, techniques, or methods as described herein, or portions thereof.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 10 and/or 11, or some other figure herein, may be configured to perform one or more processes, techniques, or methods as described herein, or portions thereof. For example, the process may include receiving, by a signaling mechanism, an indication of a secondary physical random access channel (PRACH) configuration; and identifying the secondary PRACH configuration.

In some embodiments, the electronic device of FIGS. 10 and/or 11 may be configured to perform one or more processes, techniques, and/or methods as described herein, or portions thereof.

EXAMPLES

Example 1 includes a device of a New Radio (NR) User Equipment (UE), the device including a radio frequency (RF) interface, and a processing circuitry coupled to the RF interface, the processing circuitry to: decode a physical downlink control channel (PDCCH) from a Node B, the PDCCH scheduling a physical downlink shared channel (PDSCH); determine at least one of a control resource set (CORESET) index or a starting control channel element (CCE) index of the PDCCH; decode the PDSCH; determine, based the at least one of the CORESET index or the CCE index, a physical uplink control channel (PUCCH) resource to carry hybrid automatic repeat request (HARQ) acknowledgment (ACK) (HARQ-ACK) feedback corresponding to the PDSCH to the Node B; and cause transmission of the HARQ-ACK feedback based on the PUCCH resource.

Example 2 includes the subject matter of Example 1, and optionally, wherein the PDCCH is a last received PDCCH at the UE prior to determining the PUCCH resource, wherein determining the PUCCH resource is in accordance with a priority order based on resources of the last received PDCCH.

Example 3 includes the subject matter of Example 2, and optionally, wherein the priority order is based on at least one of a component carrier (CC) index, a PDCCH monitoring occasion index, a CORESET index, a starting control channel element (CCE) index, a search space index, or a starting physical resource block (PRB) index of the PDCCH.

Example 4 includes the subject matter of Example 3, and optionally, wherein the priority order is defined as CC index>PDCCH monitoring occasion index>CORESET index>starting CCE index of the PDCCH.

Example 5 includes the subject matter of Example 3, and optionally, wherein the priority order is defined as CC index>CORESET index>starting CCE index of the PDCCH>PDCCH monitoring occasion index of the PDCCH.

Example 6 includes the subject matter of Example 3, and optionally, wherein: the PDCCH corresponds to a multi-transmission-reception point (multi-TRP) PDCCH transmission including a plurality of PDCCHs from respective ones of a plurality of transmission-reception points (TRPs); the PDSCH corresponds to a multi-TRP PDSCH transmission including a plurality of PDSCHs from the respective ones of the plurality of TRPs; the plurality of PDCCHs include respective downlink control information (DCI) transmissions in a same slot, the respective DCI transmissions corresponding to respective ones of the plurality of PDSCHs; the HARQ-ACK feedback includes combined HARQ-ACK feedbacks for the respective ones of the plurality of PDSCHs; and the priority order further includes a TRP index of each of the plurality of PDCCHs.

Example 7 includes the subject matter of any one of Examples 3-6, and optionally, wherein a PDCCH monitoring occasion corresponds to an ending symbol of a corresponding PDCCH.

Example 8 includes the subject matter of Example 1, and optionally, the processing circuitry to further determine an ordering of HARQ-ACK bits of the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH.

Example 9 includes the subject matter of Example 1, and optionally, the processing circuitry to further determine an ordering of HARQ-ACK bits of the HARQ-ACK feedback based on a set of PDCCH monitoring occasions for downlink control information (DCI) format 1_0 or DCI format 1_1 in the PDCCH, wherein the HARQ-ACK bits are to be ordered in an increasing order of serving cell index, and then in an increasing order of control resource set (CORESET) index, and then in ascending order of start time of an associated search space set, and then in increasing order of lowest channel control element (CCE) index associated with the detected DCI format.

Example 10 includes the subject matter of Example 1, and optionally, the processing circuitry is configured with different PDCCH monitoring occasions corresponding to a partial time domain overlap within a same control resource set (CORESET), the processing circuitry to further determine an ordering of HARQ-ACK bits of the HARQ-ACK feedback based on a search space index of the CORESET.

Example 11 includes the subject matter of Example 1, and optionally, the processing circuitry to further determine a size of a HARQ-ACK codebook corresponding to the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH, wherein the HARQ-ACK codebook is a Type-2 HARQ-ACK codebook.

Example 12 includes the subject matter of any one of Examples 1-11, and optionally, further including a front-end module coupled to the RF interface.

Example 13 includes the subject matter of Example 12, and optionally, further including one or more antennas coupled to the front-end module, the antennas to transmit and receive signals at the UE.

Example 14 includes a method to be performed at a device of a New Radio (NR) User Equipment (UE), including: decoding a physical downlink control channel (PDCCH) from a Node B, the PDCCH scheduling a physical downlink shared channel (PDSCH); determining at least one of a control resource set (CORESET) index or a starting control channel element (CCE) index of the PDCCH; decoding the PDSCH; determining, based the at least one of the CORESET index or the CCE index, a physical uplink control channel (PUCCH) resource to carry hybrid automatic repeat request (HARQ) acknowledgment (ACK) (HARQ-ACK) feedback corresponding to the PDSCH to the Node B; and causing transmission of the HARQ-ACK feedback based on the PUCCH resource.

Example 15 includes the subject matter of Example 14, and optionally, wherein the PDCCH is a last received PDCCH at the UE prior to determining the PUCCH resource, wherein determining the PUCCH resource is in accordance with a priority order based on resources of the last received PDCCH.

Example 16 includes the subject matter of Example 15, and optionally, wherein the priority order is based on at least one of a component carrier (CC) index, a PDCCH monitoring occasion index, a CORESET index, a starting control channel element (CCE) index, a search space index, or a starting physical resource block (PRB) index of the PDCCH.

Example 17 includes the subject matter of Example 16, and optionally, wherein the priority order is defined as CC index>PDCCH monitoring occasion index>CORESET index>starting CCE index of the PDCCH.

Example 18 includes the subject matter of Example 16, and optionally, wherein the priority order is defined as CC index>CORESET index>starting CCE index of the PDCCH>PDCCH monitoring occasion index of the PDCCH.

Example 19 includes the subject matter of Example 16, and optionally, wherein: the PDCCH corresponds to a multi-transmission-reception point (multi-TRP) PDCCH transmission including a plurality of PDCCHs from respective ones of a plurality of transmission-reception points (TRPs); the PDSCH corresponds to a multi-TRP PDSCH transmission including a plurality of PDSCHs from the respective ones of the plurality of TRPs; the plurality of PDCCHs include respective downlink control information (DCI) transmissions in a same slot, the respective DCI transmissions corresponding to respective ones of the plurality of PDSCHs; the HARQ-ACK feedback includes combined HARQ-ACK feedbacks for the respective ones of the plurality of PDSCHs; and the priority order further includes a TRP index of each of the plurality of PDCCHs.

Example 20 includes the subject matter of any one of Examples 16-19, and optionally, wherein a PDCCH monitoring occasion corresponds to an ending symbol of a corresponding PDCCH.

Example 21 includes the subject matter of Example 14, and optionally, further including determining an ordering of HARQ-ACK bits of the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH.

Example 22 includes the subject matter of Example 14, and optionally, further including determining an ordering of HARQ-ACK bits of the HARQ-ACK feedback based on a set of PDCCH monitoring occasions for downlink control information (DCI) format 1_0 or DCI format 1_1 in the PDCCH, wherein the HARQ-ACK bits are to be ordered in an increasing order of serving cell index, and then in an increasing order of control resource set (CORESET) index, and then in ascending order of start time of an associated search space set, and then in increasing order of lowest channel control element (CCE) index associated with the detected DCI format.

Example 23 includes the subject matter of Example 14, and optionally, wherein the UE is configured with different PDCCH monitoring occasions corresponding to a partial time domain overlap within a same control resource set (CORESET), the method further including determining an ordering of HARQ-ACK bits of the HARQ-ACK feedback based on a search space index of the CORESET.

Example 24 includes the subject matter of Example 14, and optionally, further including determining a size of a HARQ-ACK codebook corresponding to the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH, wherein the HARQ-ACK codebook is a Type-2 HARQ-ACK codebook.

Example 25 includes a device of a New Radio (NR) User Equipment (UE), including: means for decoding a physical downlink control channel (PDCCH) from a Node B, the PDCCH scheduling a physical downlink shared channel (PDSCH); means for determining at least one of a control resource set (CORESET) index or a starting control channel element (CCE) index of the PDCCH; means for decoding the PDSCH; means for determining, based the at least one of the CORESET index or the CCE index, a physical uplink control channel (PUCCH) resource to carry hybrid automatic repeat request (HARQ) acknowledgment (ACK) (HARQ-ACK) feedback corresponding to the PDSCH to the Node B; and means for causing transmission of the HARQ-ACK feedback based on the PUCCH resource.

Example 26 includes the subject matter of Example 14, and optionally, wherein the PDCCH is a last received PDCCH at the UE prior to determining the PUCCH resource, wherein determining the PUCCH resource is in accordance with a priority order based on resources of the last received PDCCH.

Example 27 includes a machine-readable medium including code which, when executed, is to cause a machine to perform the method of any one of Examples 14-24.

Example 28 includes a product comprising one or more tangible computer-readable non-transitory storage media comprising computer-executable instructions operable to, when executed by at least one computer processor, enable the at least one computer processor to perform the method of any one of Examples 14-24.

Example 29 includes an apparatus comprising means for causing a wireless communication device to perform the method of any one of Examples 14-24.

Example 30 includes a signal as described in or related to any of the examples herein, or portions or parts thereof.

Example 31 includes a signal in a wireless network as shown and described herein.

Example 32 includes a method of communicating in a wireless network as shown and described herein.

Example 33 includes a system for providing wireless communication as shown and described herein.

Example 34 includes an apparatus, method, or machine-readable media according to any of any one of the relevant Examples or descriptions above, wherein the apparatus, method, or machine-readable media or any portion thereof is implemented in by a base station (BS) or Node B.

Example 35 includes the subject matter of Example 3, and optionally, wherein the priority order is defined as CORESET index>CC index>PDCCH monitoring occasion index of the PDCCH.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A baseband processor, configured to:
   decode a plurality of downlink control information (DCI) formats received in a respective plurality of physical downlink control channel (PDCCH) receptions associated with multi-transmission reception point (TRP) operation, the plurality of DCI formats scheduling a respective plurality of physical downlink shared channel (PDSCH) receptions and indicating a same slot for associated physical uplink control channel (PUCCH) transmission;
   determine at least one of a control resource set (CORESET) index or a starting control channel element (CCE) index of the PDCCH corresponding to a last DCI format of the plurality of DCI formats in accordance with a priority order based on a TRP index, a serving cell index, and a PDCCH monitoring occasion index;
   determine, based on the at least one of the CORESET index or the CCE index, a physical uplink control channel (PUCCH) resource to carry a combined hybrid automatic repeat request (HARQ) acknowledgment (ACK) (HARQ-ACK) feedback corresponding to the plurality of PDSCH receptions; and
   cause transmission of the combined HARQ-ACK feedback based on the PUCCH resource.

2. The baseband processor of claim 1, wherein the priority order is based on at least one of a component carrier (CC) index a CORESET index, a starting control channel element (CCE) index, a search space index, or a starting physical resource block (PRB) index of the PDCCH.

3. The baseband processor of claim 2, wherein the priority order is defined as CC index>PDCCH monitoring occasion index>CORESET index>starting CCE index of the PDCCH.

4. The baseband processor of claim 2, wherein the priority order is defined as CC index>CORESET index>starting CCE index of the PDCCH>PDCCH monitoring occasion index of the PDCCH.

5. The baseband processor of claim 2, wherein the priority order is defined as CORESET index>CC index>PDCCH monitoring occasion index of the PDCCH.

6. The baseband processor of claim 1, wherein the baseband processor is further configured to determine an ordering of HARQ-ACK bits of the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH.

7. The baseband processor of claim 1, wherein the baseband processor is further configured to determine an ordering of HARQ-ACK bits of the HARQ-ACK feedback based on a set of PDCCH monitoring occasions for downlink control information (DCI) format 1_0 or DCI format 1_1 in the PDCCH, wherein the HARQ-ACK bits are to be ordered in an increasing order of serving cell index, and then in an increasing order of control resource set (CORESET) index, and then in ascending order of start time of an associated search space set, and then in increasing order of lowest channel control element (CCE) index associated with a detected DCI format.

8. The baseband processor of claim 1, wherein the baseband processor is configured with different PDCCH monitoring occasions corresponding to a partial time domain overlap within a same control resource set (CORESET), wherein the baseband processor is configured to further determine an ordering of HARQ-ACK bits of the HARQ-ACK feedback based on a search space index of the CORESET.

9. The baseband processor of claim 1, wherein the baseband processor is further configured to determine a size of a HARQ-ACK codebook corresponding to the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH, wherein the HARQ-ACK codebook is a Type-2 HARQ-ACK codebook.

10. A user equipment (UE) comprising a memory and one or more processors configured to, when executing instructions stored in the memory, cause the UE to:
    receive a plurality of downlink control information (DCI) formats in a respective plurality of physical downlink control channel (PDCCH) receptions associated with multi-transmission reception point (TRP) operation, the plurality of DCI formats scheduling a respective plurality of physical downlink shared channel (PDSCH) receptions an indicating a same slot for associated physical uplink control channel (PUCCH) transmission;
    determine at least one of a control resource set (CORESET) index or a starting control channel element (CCE) index of the PDCCH corresponding to a last DCI format of the plurality of DCI formats in accordance with a priority order based on a TRP index, a serving cell index, and a PDCCH monitoring occasion index;
    determine, based the at least one of the CORESET index or the CCE index, a physical uplink control channel (PUCCH) resource to carry a combined hybrid automatic repeat request (HARQ) acknowledgment (ACK) (HARQ-ACK) feedback corresponding to the plurality of PDSCH receptions; and
    causing transmission of the combined HARQ-ACK feedback based on the PUCCH resource.

11. The UE of claim 10, wherein the priority order is based on at least one of a component carrier (CC) index, a PDCCH monitoring occasion index, a CORESET index, a starting control channel element (CCE) index, a search space index, or a starting physical resource block (PRB) index of the PDCCH.

12. The UE of claim 11, wherein the priority order is defined as CC index>PDCCH monitoring occasion index>CORESET index>starting CCE index of the PDCCH.

13. The UE of claim 11, wherein the priority order is defined as CC index>CORESET index>starting CCE index of the PDCCH>PDCCH monitoring occasion index of the PDCCH.

14. The UE of claim 10, wherein the one or more processors are configured to determine an ordering of HARQ-ACK bits of the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH.

15. The UE of claim 10, wherein the one or more processors are configured to determine an ordering of HARQ-ACK bits of the HARQ-ACK feedback based on a set of PDCCH monitoring occasions for downlink control information (DCI) format 1_0 or DCI format 1_1 in the PDCCH, wherein the HARQ-ACK bits are to be ordered in an increasing order of serving cell index, and then in an increasing order of control resource set (CORESET) index, and then in ascending order of start time of an associated search space set, and then in increasing order of lowest channel control element (CCE) index associated with a detected DCI format.

16. The UE of claim 10, wherein the one or more processors are configured to determine a size of a HARQ-ACK codebook corresponding to the HARQ-ACK feedback based on at least one of a serving cell index, a control resource set (CORESET) index, a start time of a search space set associated with a PDCCH monitoring occasion, a duration the search space set associated with the PDCCH monitoring occasion, an end time the search space set associated with the PDCCH monitoring occasion, or a lowest control channel element (CCE) index of the PDCCH, wherein the HARQ-ACK codebook is a Type-2 HARQ-ACK codebook.

17. A method, comprising:
receiving a plurality of downlink control information (DCI) formats received in a respective plurality of physical downlink control channel (PDCCH) receptions associated with multi-transmission reception point (TRP) operation, the plurality of DCI formats PDCCH scheduling a respective plurality of physical downlink shared channel (PDSCH) receptions and indicating a same slot for associated physical uplink control channel (PUCCH) transmission;
determining at least one of a control resource set (CORESET) index or a starting control channel element (CCE) index of the PDCCH corresponding to a last DCI format of the plurality of DCI formats in accordance with a priority order based on a TRP index, a serving cell index, and a PDCCH monitoring occasion index;
determining, based on the at least one of the CORESET index or the CCE index, a physical uplink control channel (PUCCH) resource to carry a combined hybrid automatic repeat request (HARQ) acknowledgment (ACK) (HARQ-ACK) feedback corresponding to the plurality of PDSCH receptions; and
transmitting the combined HARQ-ACK feedback based on the PUCCH resource.

\* \* \* \* \*